US012212598B2

(12) United States Patent
Vera-Schockner

(10) Patent No.: US 12,212,598 B2
(45) Date of Patent: Jan. 28, 2025

(54) JAVASCRIPT ENGINE FINGERPRINTING USING LANDMARK FEATURES AND API SELECTION AND EVALUATION

(71) Applicant: Akamai Technologies, Inc., Cambridge, MA (US)

(72) Inventor: Simon E. Vera-Schockner, Herndon, VA (US)

(73) Assignee: Akamai Technologies, Inc., Cambridge, MA (US)

( * ) Notice: Subject to any disclaimer, the term of this patent is extended or adjusted under 35 U.S.C. 154(b) by 329 days.

(21) Appl. No.: 17/405,598

(22) Filed: Aug. 18, 2021

(65) Prior Publication Data

US 2022/0191241 A1   Jun. 16, 2022

Related U.S. Application Data

(60) Provisional application No. 63/125,585, filed on Dec. 15, 2020.

(51) Int. Cl.
| | |
|---|---|
| *H04L 29/06* | (2006.01) |
| *G06F 9/455* | (2018.01) |
| *G06F 9/54* | (2006.01) |
| *H04L 9/40* | (2022.01) |

(52) U.S. Cl.
CPC ...... *H04L 63/1441* (2013.01); *G06F 9/45529* (2013.01); *G06F 9/547* (2013.01); *H04L 2463/144* (2013.01)

(58) Field of Classification Search
CPC ............ H04L 63/1416; H04L 63/1483; H04L 63/1441; H04L 63/0876; H04L 2463/144; H04L 67/133; G06F 9/547; G06F 9/45529

See application file for complete search history.

(56) References Cited

U.S. PATENT DOCUMENTS

| | | | |
|---|---|---|---|
| 2016/0191554 A1* | 6/2016 | Kaminsky | H04L 63/1425 726/23 |
| 2018/0267847 A1* | 9/2018 | Smith | G06F 9/54 |

\* cited by examiner

*Primary Examiner* — Tri M Tran
(74) *Attorney, Agent, or Firm* — David H. Judson

(57) ABSTRACT

A method and apparatus for data collection to facilitate bot detection. According to this approach, and in lieu of conventional user agent-based fingerprinting, a client script is executed to attempt to identify one or more Javascript "landmark" features. In one embodiment, a landmark Javascript feature is a Javascript implementation that exists in a first browser type but not a second browser type distinct from the first browser type, and that also exists in one or more releases of the first browser type, but not in one or more other releases of the first browser type. By testing against landmark Javascript features as opposed to an unconstrained set of API calls and the like, the technique herein provides for much more computationally-efficient client-side operation.

15 Claims, 4 Drawing Sheets

FIG. 5

| | CHROME | EDGE | FIREFOX | OPERA | SAFARI | FIREFOX FOR ANDROID |
|---|---|---|---|---|---|---|
| allowPopupsForUserEvents | NO ✗ | NO ✗ | 57 | NO ✗ | NO ✗ | 57 |
| cacheEnabled | NO ✗ | NO ✗ | 56 | NO ✗ | NO ✗ | 56 |
| closeTabsByDoubleClick | NO ✗ | NO ✗ | 61 | NO ✗ | NO ✗ | NO ✗ |
| contextMenuShowEvent | NO ✗ | NO ✗ | 59 | NO ✗ | NO ✗ | 59 |
| ftpProtocolEnabled | NO ✗ | NO ✗ | 72 | NO ✗ | NO ✗ | NO ✗ |
| homepageOverride | NO ✗ | NO ✗ | 57 | NO ✗ | NO ✗ | 57 |
| imageAnimationBehavior | NO ✗ | NO ✗ | 57 | NO ✗ | NO ✗ | 57 |
| newTabPageOverride | NO ✗ | NO ✗ | 57 | NO ✗ | NO ✗ | 57 |
| newTabPosition | NO ✗ | NO ✗ | 61 | NO ✗ | NO ✗ | 61 * |
| openBookmarksInNewTabs | NO ✗ | NO ✗ | 59 | NO ✗ | NO ✗ | 59 |
| openSearchResultsInNewTabs | NO ✗ | NO ✗ | 59 | NO ✗ | NO ✗ | 59 |
| openUrlbarResultsInNewTabs | NO ✗ | NO ✗ | 61 | NO ✗ | NO ✗ | 61 |
| overrideDocumentColors | NO ✗ | NO ✗ | 61 | NO ✗ | NO ✗ | 61 |
| useDocumentFonts | NO ✗ | NO ✗ | 61 | NO ✗ | NO ✗ | 61 |
| webNotificationsDisabled | NO ✗ | NO ✗ | 58 | NO ✗ | NO ✗ | 58 |
| zoomFullPage | NO ✗ | NO ✗ | 75 | NO ✗ | NO ✗ | NO ✗ |
| zoomSiteSpecific | NO ✗ | NO ✗ | 75 | NO ✗ | NO ✗ | NO ✗ |

* SEE IMPLEMENTATION NOTES

☐ FULL SUPPORT

☒ NO SUPPORT

JAVASCRIPT ENGINE FINGERPRINTING USING LANDMARK FEATURES AND API SELECTION AND EVALUATION

BACKGROUND

Technical Field

This application relates generally to protecting websites and mobile applications (apps) from automated attacks by scripts or bots using TLS connections.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Javascript is the defacto programming language utilized in modern web programming. Every modern browser has a Javascript interpreter and engine built in. Every version of each such browser also typically has a unique set of functionality. This unique functionality can be potentially used to identify browser versions, bots, and malicious attackers. By including a piece of Javascript in a website (that serves the function to test key Javascript implementations in the browser) and sending the resulting information off to a collection server, one is able to create a fingerprint of the client browser's functionality. By comparing this fingerprint to a set or database of known fingerprints, one can then determine the type of browser, and potentially the version of the browser the client uses.

As further background, and for privacy and related reasons, Google recently announced its intention to phase out the use of "user-agent" strings in its Chrome browser. A UA string is a text string that the browser sends to a website, and this data typically includes information identifying the browser type, rendering engine and end user machine operating system. In lieu of the user-agent string, the browser will implement a functionality called client-hints. Using this mechanism, the website can request specific information about a user-agent (e.g., brand, the UA's marketing version, the UA's full build version, UA's operating system commercial name, the UA's underlying CPU architecture, the UA's device model, and a Boolean value indicating if the UA's device is a mobile device), and the UA can respond or not. As conventional UA-based fingerprinting is deprecated, new mechanisms for fingerprinting browser versions to facilitate performance, usability, and security aspects, will still be necessary.

BRIEF SUMMARY

This disclosure is directed to a method and apparatus for data collection, e.g., to facilitate bot detection. According to this approach, and in lieu of conventional user agent-based fingerprinting, a client script is executed to attempt to identify one or more Javascript "landmark" features. In one embodiment, a landmark Javascript feature is a Javascript implementation that exists in a first browser type but not a second browser type distinct from the first browser type, and that also exists in one or more releases of the first browser type, but not in one or more other releases of the first browser type. By testing against landmark Javascript features as opposed to an unconstrained set of API calls and the like, the technique herein provides for much more computationally-efficient client-side operation.

In an example fingerprinting operation, a client browser receives a script that identifies APIs to test, as well as function calls within those APIs. Testing then proceeds as follows. For a given browser type as identified in the script, a first coarse-grained evaluation is performed against one or more application programming interface (API) calls. For a particular API call, a determination is made whether the particular API call is supported by the browser. If so, the browser type is known or can be ascertained. Upon determining that the particular API call is supported by the browser, a second fine-grained evaluation is then performed against one or more function calls associated with the particular API call. The results of the second evaluation enable a determination regarding what particular version (release) of the browser type is executing. The results of these tests are returned, e.g., to a bot detection service, where they are used for various purposes, such as building up a database of relevant scripting engine fingerprints, for real-time detection, to facilitate training machine learning models, and the like.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 5 depicts a representative browser compatibility matrix depicting a set of browsers, and a set of Javascript APIs and an indication of their presence or absence in each of the identified browsers.

DETAILED DESCRIPTION

Figure 1:
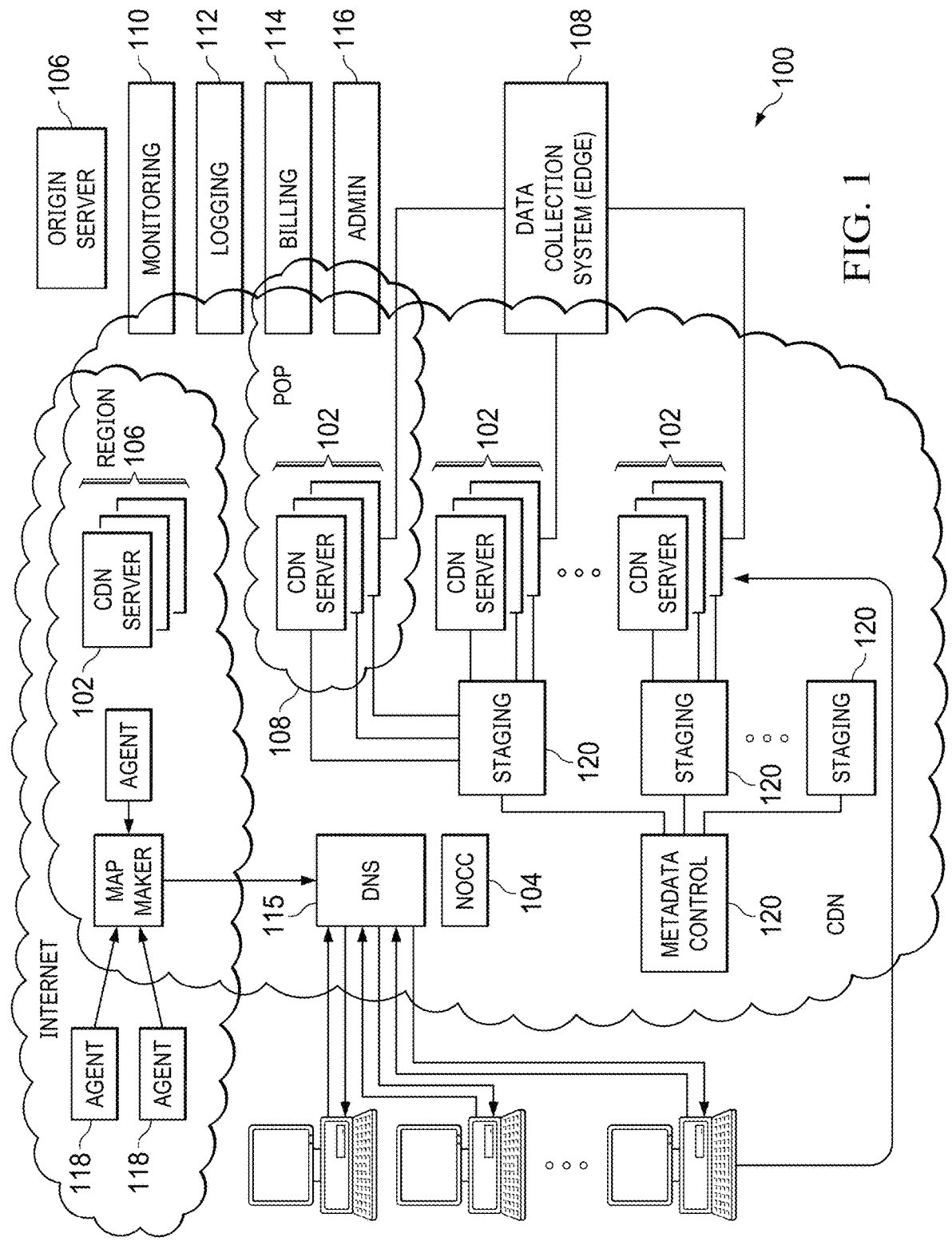
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
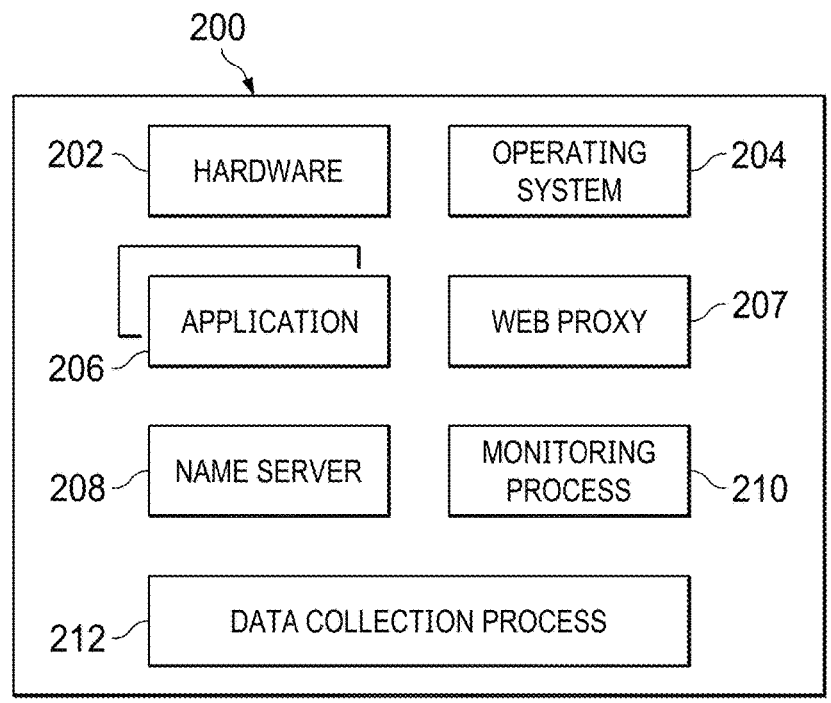
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206*a-n*. To facilitate content delivery services, for example, given machines typically run a set of applications, such as an HTTP proxy 207 (sometimes referred to as a "global host" process), a name server 208, a local monitoring process 210, a distributed data collection process 212, and the like.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Thus, and as used herein, an "edge server" refers to a CDN (overlay network) edge machine. For a given customer, the CDN service provider may allow a TCP connection to originate from a client (e.g., an end user browser, or mobile app) and connect to an edge machine representing the customer on a virtual IP address (VIP) assigned to the customer, or a general VIP that allows for discovery of the intended customer. For purposes of this disclosure, it is assumed that this edge machine does not have the customer's private key or the customer's certificate.

Figure 3:
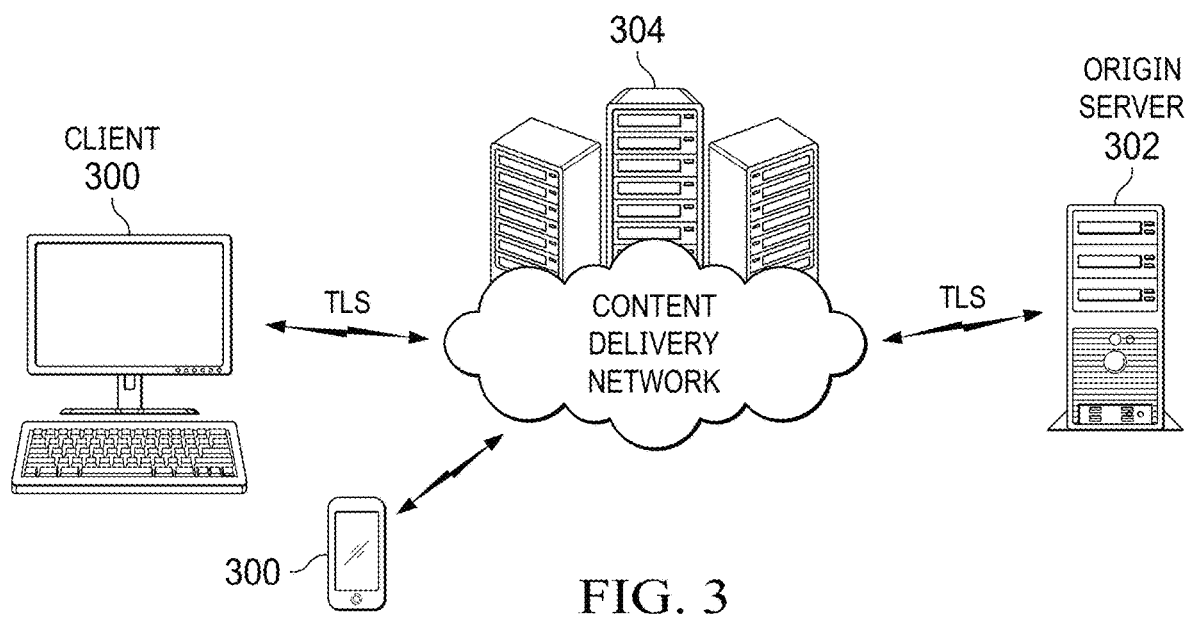
FIG. 3 is a representative active TLS session among a requesting end user client, an edge server, and an origin server.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting.

As further background, HTTP requests are expected to come with certain headers, for example the Host header, which may indicate which web server is being addressed, or the User-agent, which identifies what type of system (browser, device) is making the request so that the web server hosting the content can response with content adapted to the system that requests it. Different browsers (Edge, Firefox, Safari, Chrome, Opera) send more or less the same set of headers, but the order in which headers are sent varies from one browser to the next or the HTTP protocol version. The header sent also depends on the method of the (POST vs. GET). and the type (XHR request vs. text/html requests). The order of the HTTP header and the protocol version constitutes a header fingerprint.

It is known to perform client request anomaly detection by evaluating a request header signature and looking for anomalies typically seen with bots. If the total anomaly score reaches a predefined threshold, an action rule will trigger. Some of these rules are designed to evaluate the header order of requests coming from client claiming to be Firefox, Chrome, Opera, Safari, Internet Explorer or Microsoft Edge.

Basic bots and botnets can be detected relatively easily using such detection techniques. These more simplistic bots usually give themselves away because there are enough anomalies in the header signature, or their behavior is atypical of a regular user. That said, the system may produce false negatives with respect to highly distributed botnets that "hide" behind a proxy, send request at a low rate, or perhaps have little to no anomalies in their header signatures. To detect these more sophisticated botnets, sometimes running on a headless browser (e.g., CasperJS, PhantomJS, Selenium, NodeJS), more advanced detection techniques may be used. Javascript injection techniques are widely used in the industry to help detect these more advanced botnets. In particular, a bot that shows little anomalies in the header signature and behaves "like a regular user" may actually not fully support Javascript. For a bot that fully supports Javascript, it is desirable to inject code that helps collect specific characteristics (a fingerprint) of the client that when evaluated, helps detect them.

Figure 4:
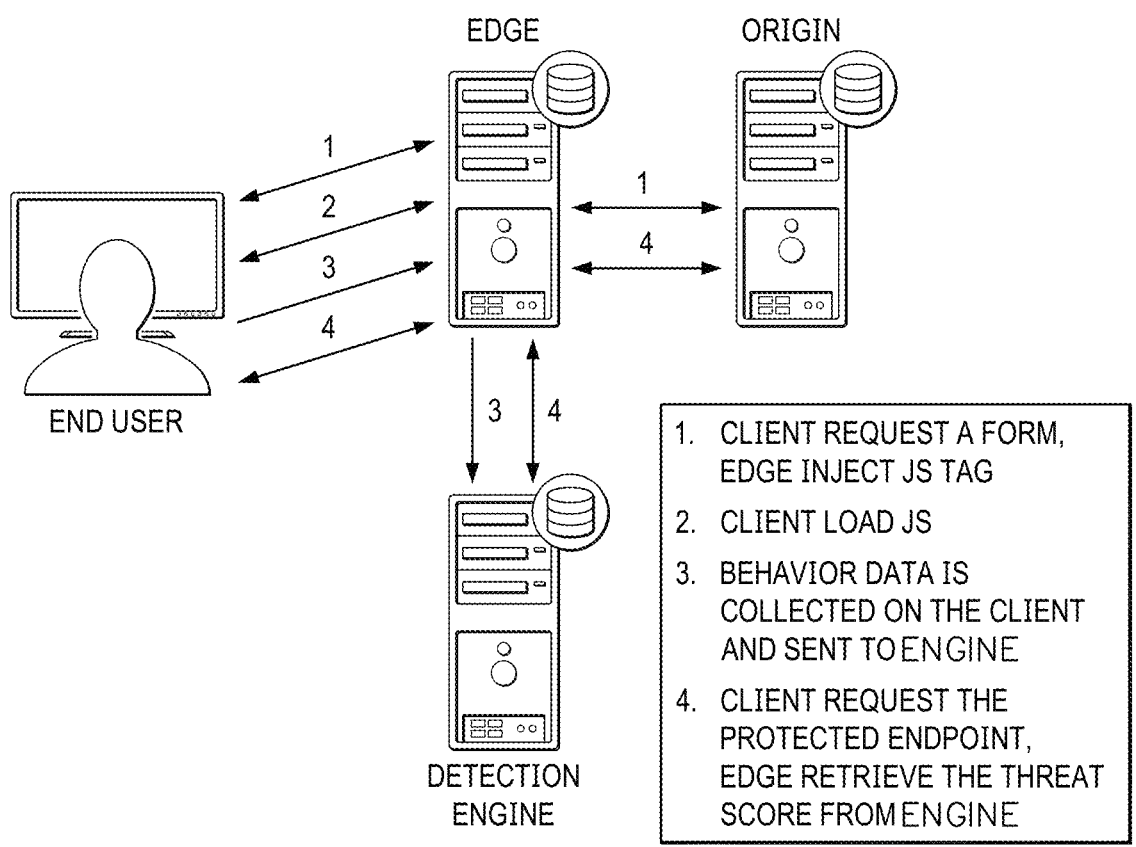
FIG. 4 is a technique by which a script-based technology is used to collect a fingerprint and other behavioral data from a requesting client.

Bot detection using information collected through Javascript (JS) may proceed as follows. With reference to FIG. 4, and at step (1), the JS is dynamically injected at the edge on the relevant pages (text/html). At step (2), the client loads the JS, executes it, and sends the data collected asynchronously. At step (3), the edge server intercepts and evaluates the JS fingerprint, looking for specific anomalies typically seen when coming from an automated system (script or bot, etc.). At step (4), each anomaly is given a score and, if the fingerprint total anomaly score goes beyond a certain threshold, the client is classified as a bot. The result of the fingerprint evaluation is recorded in a session cookie and evaluated with each subsequent request.

Thus, and as depicted in FIG. 4, Javascript-based technology collects a lightweight fingerprint and other behavioral data from the client. The data is collected asynchronously and sent to a bot detection engine. On a protected request (e.g., TLS-secured POST login), the edge server obtains the client classification from the bot detection engine and applies it on the edge.

Several methods may be used to detect bots using the fingerprint include, without limitation, anomaly detection, dynamic rate limiting, and blacklisting.

Anomaly detection is based on the principle that good browsers (such as Chrome, Firefox, Safari, and the like) have a few valid combinations of given fingerprints for each browser version. The "known" or "correct" combinations are learned a-priori. This can be done by analyzing prior human traffic and building a table of valid combinations (user agent and associated fingerprint possibilities). A bot script masquerading its user-agent as one of the well-known browsers is then caught by checking for the existence of the user-agent and the given fingerprint in the "known/correct" table.

Dynamic rate limiting is based on the principle that the system keeps tracks of the received fingerprints and then rate limits given fingerprints. Bot Attacks can be blocked in this way, as the given fingerprint will rapidly exceed the allowed rate threshold.

Blacklisting is based on the principle that the fingerprints of malicious bot tools can be collected and stored in a database/file (also known as a blacklist file). When a fingerprint is part of this blacklist file, it is then blocked.

All of the above techniques can be modulated with other signals to produce higher accuracy.

Javascript Engine Fingerprinting Based on API Analysis

With the above as background, the techniques of this disclosure are now described.

One implementation of a fingerprint engine is now described. It includes a Javascript library included in a web application/web page. This library is used to selectively test for a set of Javascript APIs. Upon receiving this library (e.g., via a web page), the client runs this fingerprinting Javascript library in the local browser. The fingerprinting Javascript library sends the results of the tests back to a service with the results of the tests. In particular, the service collects the Javascript results from the client. It contains a database of known API results for all known browsers. The results collected by the library are then compared against the database. The above approach may be augmented with one or more other metrics in conjunction with fingerprinting to make a risk score of the client. One or more business-based policy decisions are then made based on the results of the comparison.

In this example embodiment, the fingerprint database may include artifacts other than just Javascript engine fingerprinting. Other metrics that can be collected include: user-agent strings, TLS fingerprints (e.g., cipher suite ordering, cipher suite fuzzing), client hint responses, browser dimensions (e.g., mobile versus desktop), installed browser extensions, and others. Preferably, the APIs that are tested are ones that have been shown to have inconsistent implementations across browser types and/or within browser versions.

There are several potential use cases, such as bot detection, masquerading user detection, and others.

By creating a business policy decision to block any unknown or mismatched Javascript fingerprints, one can then reject a client from their services, mark their session for future investigation, or other policy-based decisions. The system can compare multiple metrics against the existing database to determine whether or not a client is a bot. Examples: a simple python/curl/wget bot does not have a Javascript engine and would be detected immediately; a browser with a forged user-agent string or user-hints may have incongruous returns; a browser may be running in headless mode and this can be detected by a Javascript API call.

The following describes an algorithm to determine browser type, and one mechanism to efficiently determine browser versions. By way of further background, there are many different APIs that browsers have to execute against. Executing against all APIs is inefficient and resource intensive. To determine which APIs to execute against, the approach herein considers carefully how to choose which APIs to use (and thus test against). One algorithm for efficiently determining browser type and versions utilizing different API calls is now described as an example of the general approach.

Like landmarks that delineate two different pieces of land, as used herein a landmark Javascript feature delineates two different implementations of the Javascript engine. In one embodiment, a landmark Javascript feature is a Javascript engine implementation that exists in one type of browser and not in another, and that also exists in one version of that browser and not in another, e.g., the feature exists in Firefox, but not in Chromium, and the feature exists only in a specific version and afterwards of Firefox. Just as a complete map of every county and river and landmark in the United States is not required to know one's location relative to a particular State, the notion herein is that the fingerprint mechanism can similarly optimize determining the UA Javascript engine using such landmark Javascript features.

To this end, the library can utilize an algorithm that narrows down the number of Javascripts tests to gauge roughly what browser and version, and then executes a fine-grained resolution of what browser is being detected. One such algorithm works as follows. In particular, a landmark Javascript feature can be any API call that does not exist in a browser, or in previous versions of the browser.

Preferably, and because evaluation of some APIs can produce false positives (e.g., those that require end user interaction), preferably the landmark JS features are associated with API functions that are not visible to the end user, and that have a large feature disparity across browser types, and/or browser versions. The library is then provisioned/configured to test for API functions that encompass the type of data that a service/server seeks to know about the end user. For example, if an end-user is using Firefox, the library can be provisioned to test a browserSettings API. Using a data structure, such as the matrix provided by the Mozilla organization and reproduced at FIG. 5, a positive result indicates that the client is indeed running Firefox. After this coarse-grained determination is made, a more fine-grained determination can be made by testing various function calls within this browserSettings API and, in particular, to identify mechanisms that only appear after certain browser release numbers.

To provide a more concrete example, and using a compatibility matrix either from community-sourced locations (e.g., as shown in FIG. 5), or as otherwise determined by independent testing, one can determine if a version of Firefox is greater than or equal to version 56 (in this example) by calling the cacheEnabled Javascript function. If that function is enabled, then the library can test ftpProtocolEnabled; if that function call works, the library determines that the version is greater than or equal to 72 but, if not, the library knows that the version is between 56 and 72. A function such as allowPopupsForUserEvents can then be tested to determine if the version is 57. If the version is greater than 72, the library can then test to see if it is greater than or equal to version 75 and, in particular, by testing the zoomFullPage Javascript call. These are just representative examples.

This algorithm's efficiency depends on the amount of feature disparity in current and future browser Javascript API. The efficiency of this resides somewhere between linear $O(n)$ (running every function call) and logarithmic, $O(\log(n))$.

Summarizing, the browser validation process collects information from the client using Javascript techniques to help identify the type of client machine the edge server is interacting with and the configuration of the browser. This technique is often times referred as "fingerprinting." The process does not collect any information that could identify the user of the machine. The data collected (also know as the fingerprint) preferably is sent to a data collection platform and kept for a given time period. Preferably, the fingerprint is used to enable the provider to research and define new heuristics that help the bot detection engine to detect more advanced bots. These heuristics are preferably instantiated as detection rules and become part of a fingerprint evaluation ruleset. Preferably, the fingerprint process is only executed once a session. By analyzing the fingerprint and combining multiple parameters of the fingerprints together, it is possible to uniquely identify the client and to identify which site protected with the browser validation technology a given client visited. As additional related fingerprint information is collected and analyzed, the fingerprint evaluation ruleset may evolve, allowing the system to detect more bots. Preferably, clients that are identified as bots are tracked through their session cookie. The session cookie is unique to a given web site and cannot be used to correlate the activity of a given bot on other web sites, although the system may provide for the ability to track the activity of a botnet across customers that use the bot detection service. Activity coming from these bots preferably is tracked and reported. Logs of this activity are then to generate bot activity and bot analysis reports that can be reviewed by a customer through a secure portal.

Without intending to be limiting, the following provides additional details about the data collection process. Preferably, the JS injection technique collects client characteristics by querying DOM window objects, and also collects client characteristics by detecting browser automation. To enhance security, preferably the JS code is either statically- or dynamically-generated per request. The JS code is then obfuscated, and there may be several versions of the obfuscated object to make the code appear to be different each time. The version of the JS served is recorded in the cookie to validate that a client follows a predefined workflow. Data collected by the JS is sent to the server as a URL-encoded form POST. The edge server extracts the relevant parameters and evaluates the values in-line to detect the bot. If a bot is detected, the session is flagged, and the full fingerprint is forwarded to other systems for further evaluation, typically off-line. Preferably, the JS executes a challenge that is self-contained in a single object. The code may be minified. Preferably, when injecting the JS, the transformed object is not cached at the edge. Cache busting headers may be sent to the client to prevent the transformed object to be cached by the browser or an intermediate proxy, and to further prevent false positives. The JS challenge object may be cached at the edge for a given time period.

Other Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted in FIGS. 1-2, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

As has been described, it is known to provide a Javascript-based technology to fingerprint clients and collect telemetry to evaluate the user behavior and differentiate bots from humans. Among other uses, this technology is useful to protect transactional workflows such as login, checkout, search, gift card validation, coupons/rebates processing, etc., and that are regularly the target of fraud activity using botnets. The technology may also be used to protect web sites against scraping activities.

What is claimed is:

1. A method to facilitate bot detection and mitigation, comprising:
receiving, as a fingerprint, information identifying a browser type and version, the fingerprint having been generated at a client using a script that examines Javascript API calls associated with a browser to identify presence or absence of one or more Javascript landmark features;
comparing the fingerprint against a dataset of fingerprints representing API results for browsers that have been determined to be valid;
taking an action based on a result of the comparing, wherein the action is providing an indication that the client is one of: a bot, and a human actor; and
implementing a block when the indication is that the client is a bot.

2. The method as described in claim 1 wherein a Javascript landmark feature is a Javascript implementation that exists in a first browser type but not a second browser type distinct from the first browser type, and that also exists in one or more releases of the first browser type, but not in one or more other releases of the first browser type.

3. The method as described in claim 1 wherein the script selects a reduced set Javascript API calls to test against to identify presence or absence of the one or more Javascript landmark features.

4. The method as described in claim 3 wherein the reduced set of Javascript API calls are identified in a browser compatibility matrix.

5. The method as described in claim 1 wherein the fingerprint represents that the browser associated with the client supports both a particular Javascript API call, and one or more particular function calls associated with the particular Javascript API call.

6. The method as described in claim 1 wherein a particular Javascript landmark feature is associated with a function or feature that is not visible to a user.

7. The method as described in claim 1 wherein the script performs a coarse-grained evaluation on a particular Javascript API call and a fine-grained evaluation on a particular function call associated with the particular Javascript API call.

8. The method as described in claim 1, wherein at least one Javascript API call is associated with a function or feature that is not visible to a user.

9. The method as described in claim 1, wherein the browser type and version are associated with information defined in a browser compatibility matrix.

10. The method as described in claim 9, the script having executed first and second evaluations against a subset of the browser types identified in the browser compatibility matrix.

11. Apparatus, comprising:

one or more hardware processors;

computer memory holding computer program code executed by the one or more hardware processors to facilitate bot detection and mitigation, the computer program code configured to:

receive, as a fingerprint, information identifying a browser type and version, the fingerprint having been generated at a client using a script that examines Javascript API calls associated with a browser to identify presence or absence of one or more Javascript landmark features;

compare the fingerprint against a dataset of fingerprints representing API results from browsers that have been determined to be valid;

take an action based on a result of the comparing, wherein the action is providing an indication that the client is one of: a bot, and a human actor; and implement a block when the indication is that the client is a bot.

12. The apparatus as described in claim 11, wherein a Javascript landmark feature is a Javascript implementation that exists in a first browser type but not a second browser type distinct from the first browser type, and that also exists in one or more releases of the first browser type, but not in one or more other releases of the first browser type.

13. The apparatus as described in claim 11, wherein the script selects a reduced set Javascript API calls to test against to identify presence or absence of the one or more Javascript landmark features.

14. The apparatus as described in claim 11, wherein the fingerprint represents that the browser associated with the client supports both a particular Javascript API call, and one or more particular function calls associated with the particular Javascript API call.

15. The apparatus as described in claim 11, wherein a particular Javascript landmark feature is associated with a function or feature that is not visible to a user.

* * * * *